Figure 1:
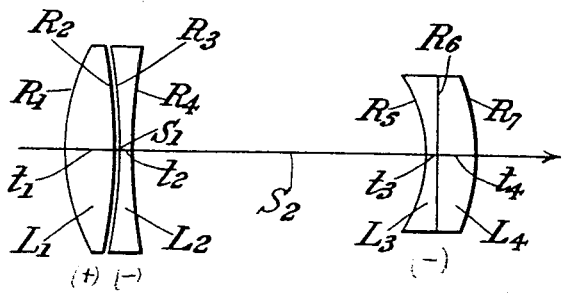

L. B. BOOTH.
OBJECTIVE FOR PHOTOGRAPHIC AND LIKE PURPOSES.
APPLICATION FILED JAN. 25, 1915.

1,156,743.   Patented Oct. 12, 1915.

Witnesses:

Inventor
Lionel B. Booth
by
James L. Norris
Attorney

Draftsman

UNITED STATES PATENT OFFICE.

LIONEL BARTON BOOTH, OF CAMBRIDGE, ENGLAND.

OBJECTIVE FOR PHOTOGRAPHIC AND LIKE PURPOSES.

1,156,743.      Specification of Letters Patent.      Patented Oct. 12, 1915.

Application filed January 25, 1915. Serial No. 4,334.

*To all whom it may concern:*

Be it known that I, LIONEL BARTON BOOTH, a subject of the King of Great Britain, residing in Cambridge, England, have invented certain new and useful Improvements in Objectives for Photographic and like Purposes, of which the following is a specification.

This invention relates to optical systems generally known under the name of telephoto objectives, in which the distance from the last surface of the objective of the image of an object at an infinite, or extremely large distance from the objective is considerably less than the focal length of the system: the result being that, for photographic purposes, a large focal length is obtained with a comparatively small camera extension.

The aim of the invention is to secure, by means of a system of this type, as perfect definition as possible over a large field with as few lenses as possible, and also to secure a large relative aperture. In this, as in all telephoto systems, there are two groups of lenses (the term lens being used to mean a lens made of one piece and kind of glass) the front group being a positive or collective system and the back group a negative or dispersive system.

By calculation it is found that an astigmatic flatness of field, together with a large relative aperture, can be obtained by the use of four lenses only; and in this invention four lenses only are used. These are divided into two groups of two, separated by an interval. In the mounting of the system this interval may, if necessary, be made variable. One of these groups consists of two lenses inclosing an air space between their two facing surfaces, and the other group consists of two lenses in contact and cemented together. The power of the two facing surfaces in the one group is negative, or, in other words, the two facing surfaces in the one group together have a dispersive effect: while the power of the cemented surface is, for the ray D of the solar spectrum, either negative or substantially equal to zero—in other words, the cemented surface must either have a dispersive effect, or its collective effect must be wholly inappreciable.

Objectives have been made in which there is an air space of dispersive effect and a cemented surface of dispersive effect, as in the case of the portrait objective of the so-called Petzval type: but they have not been of the telephoto type, nor has the correction for astigmatism been of a very high order. Telephoto objectives have also been made of four lenses, but they have consisted of two cemented pairs. Correction for chromatic aberration is secured by choosing the glasses so that each group of two lenses is separately approximately corrected for chromatic aberration.

Two examples of the objective described are shown in the drawing and full details are given below of the exact construction. In both examples the different single lenses are denoted by $L_1$, $L_2$, $L_3$ and $L_4$ and in both cases the combined power of the first pair $L_1$ and $L_2$ is positive, and of the second pair $L_3$ and $L_4$ negative.

In the first example (Figure 1) there is an air space between $L_1$ and $L_2$ and the effect of the pair of facing surfaces $R_2$ and $R_3$ is dispersive, while the two lenses $L_3$ and $L_4$, separated from the group $L_1$ and $L_2$ by an interval are cemented together, the power of the surface $R_6$ being in this case zero. In the second example (Fig. 2) the lenses $L_1$ and $L_2$ are cemented together and the power of the cemented surface $R_2$ is dispersive: while the lenses $L_3$ and $L_4$, separated from the group $L_1$ and $L_2$ by an interval inclose an air space between the surfaces $R_5$ and $R_6$ and the power of these two facing surfaces is dispersive.

Substantial departures from the kinds of glasses given and from the shapes and arrangements of the lenses may be made provided that the construction is in accordance with the principles already laid down. The focal lengths of both objectives of which drawings and details are given are approximately twelve units and the radii, thicknesses and separations for other focal lengths will be obtained by proportionate increase or decrease.

$R_1$, $R_2$, $R_3$, $R_4$, $R_5$, $R_6$, $R_7$ denote the radii of the surfaces $t_1$, $t_2$, $t_3$, $t_4$ the thicknesses of the lenses $L_1$, $L_2$, $L_3$, $L_4$ respectively, and $S_1$, $S_2$ the air separations, measured along the axis.

*Example 1.*     *Fig. 1.*

$R_1 = +2.176$      $t_1 = .4$
$R_2 = -5.128$      $S_1 = .015$
$R_3 = -4.85$       $t_2 = .1$
$R_4 = +4.663$      $S_2 = 2.78$
$R_5 = -1.3$        $t_3 = .1$
$R_6 = \infty$      $t_4 = .4$
$R_7 = -2.0$ Focal length=12: relative aperture F:6.

*Glasses used.*

|  | $L_1$ | $L_2$ | $L_3$ | $D_4$ |
|---|---|---|---|---|
| $n_D$ | 1.6053 | 1.6117 | 1.57316 | 1.5738 |
| $n_F$ | 1.6125 | 1.6234 | 1.58098 | 1.5837 |
| $n_{G_1}$ | 1.6183 | 1.6333 | 1.58739 | 1.5920 |

Figure 2:
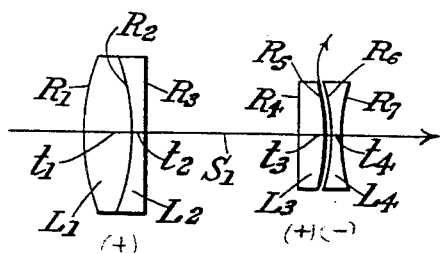

*Example 2.*     *Fig. 2.*

$R_1 = +2.182$
$R_2 = -2.0578$     $t_1 = .454$
$R_3 = +26.11$      $t_2 = .117$
$R_4 = +25.21$      $S_1 = 1.407$
$R_5 = -1.6947$     $t_3 = .248$
$R_6 = -1.4610$     $S_2 = .04$
$R_7 = +2.2061$     $t_4 = .1135$

Focal length=12: relative aperture F:8.

*Glasses used.*

|  | $L_1$ | $L_2$ | $L_3$ | $L_4$ |
|---|---|---|---|---|
| $n_D$ | 1.5899 | 1.6259 | 1.6129 | 1.6119 |
| $n_F$ | 1.5967 | 1.6381 | 1.6247 | 1.61965 |
| $n_{G_1}$ | 1.6022 | 1.6485 | 1.6348 | 1.62593 |

$n_D$, $n_F$, $n_{G_1}$ being the refraction indices for the D and F lines of the solar spectrum and for the H$\gamma$ line of the hydrogen spectrum respectively.

Having thus described the nature of the said invention and the best means I know of carrying the same into practical effect, I claim:—

1. A spherically, chromatically and astigmatically corrected telephoto objective consisting of a group of two oppositely disposed lenses having an air space between the pair of facing surfaces, and a second group of two lenses arranged in contact and cemented together, said second group arranged in axial alinement and spaced apart from the first group, the power of the cemented surface being dispersive or substantially zero, and the power of the pair of facing surfaces being dispersive, while the power of one group is dispersive and at least numerically equal to that of the other group.

2. A spherically, chromatically and astigmatically corrected telephoto objective consisting of a group of two oppositely disposed lenses having an air space between the pair of facing surfaces, and a second group of two lenses arranged in contact and cemented together, said second group arranged in axial alinement and adjustably spaced apart from the first group, the power of the cemented surface being dispersive or substantially zero, and the power of the pair of facing surfaces being dispersive, while the power of one group is dispersive and at least numerically equal to that of the other group.

3. A spherically, chromatically and astigmatically corrected telephoto objective consisting of a group of two oppositely disposed lenses having an air space between the pair of facing surfaces, and a second group of two lenses arranged in contact and cemented together, said second group arranged in axial alinement and spaced apart from the first group, the power of the cemented surface being dispersive or substantially zero, and the power of the pair of facing surfaces being dispersive, while the power of one group is dispersive and numerically greater than that of the other group.

In testimony whereof I have signed my name to this specification in the presence of two subscribing witnesses.

LIONEL BARTON BOOTH.

Witnesses:
  G. W. L. FERNANDES,
  H. ARTHUR SMITH.

Copies of this patent may be obtained for five cents each, by addressing the "Commissioner of Patents, Washington, D. C."